United States Patent
Bi et al.

(10) Patent No.: US 10,505,611 B2
(45) Date of Patent: Dec. 10, 2019

(54) METHOD FOR OBTAINING CHANNEL SPATIAL CHARACTERISTIC INFORMATION, AND BASE STATION

(71) Applicant: HUAWEI TECHNOLOGIES CO., LTD., Shenzhen, Guangdong (CN)

(72) Inventors: Xiaoyan Bi, Shanghai (CN); Dageng Chen, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 112 days.

(21) Appl. No.: 15/637,398

(22) Filed: Jun. 29, 2017

(65) Prior Publication Data
US 2017/0302351 A1  Oct. 19, 2017

Related U.S. Application Data

(63) Continuation of application No. PCT/CN2014/095620, filed on Dec. 30, 2014.

(51) Int. Cl.
*H04B 7/06* (2006.01)
*H04W 24/10* (2009.01)
(Continued)

(52) U.S. Cl.
CPC ......... *H04B 7/0621* (2013.01); *H04B 7/0413* (2013.01); *H04L 1/06* (2013.01);
(Continued)

(58) Field of Classification Search
CPC ...... H04B 7/0413; H04B 7/04; H04B 7/0621; H04W 24/10; H04W 16/28; H04W 88/08;
(Continued)

(56) References Cited

U.S. PATENT DOCUMENTS

| 9,439,096 B2 * | 9/2016 | Josiam ................. H04W 24/10 |
| 2011/0098054 A1 | 4/2011 | Gorokhov et al. |

(Continued)

FOREIGN PATENT DOCUMENTS

| CN | 102013952 | 4/2011 |
| CN | 103139905 A | 6/2013 |

(Continued)

OTHER PUBLICATIONS

International Search Report, dated Oct. 13, 2015, in International Application No. PCT/CN2014/095620 (4 pp.).

(Continued)

*Primary Examiner* — Kyaw Z Soe
(74) *Attorney, Agent, or Firm* — Kilpatrick Townsend & Stockton LLP

(57) ABSTRACT

Embodiments of the present invention provide a method for obtaining channel spatial characteristic information, and a base station. The method includes: separately sending, by a first base station, a channel spatial characteristic request and an identity of to-be-measured user equipment (UE) to multiple second base stations, where the channel spatial characteristic request is used to instruct the second base station to perform channel spatial characteristic information measurement on the to-be-measured UE; and receiving, by the first base station, channel spatial characteristic indication information sent by the multiple second base stations, where the channel spatial characteristic indication information carries channel spatial characteristic information of the to-be-measured UE.

20 Claims, 5 Drawing Sheets

A first base station separately sends a channel spatial characteristic request and an identity of to-be-measured UE to multiple second base stations — S101

The first base station receives channel spatial characteristic indication information sent by the multiple second base stations, where the channel spatial characteristic indication information carries channel spatial characteristic information of the to-be-measured UE — S102

(51) Int. Cl.
  *H04B 7/0413* (2017.01)
  *H04L 1/06* (2006.01)
  *H04L 25/02* (2006.01)
  *H04B 7/04* (2017.01)

(52) U.S. Cl.
  CPC ............ *H04L 1/0625* (2013.01); *H04L 25/02* (2013.01); *H04W 24/10* (2013.01); *H04B 7/04* (2013.01)

(58) Field of Classification Search
  CPC ........ H04W 92/20; H04L 1/06; H04L 1/0625; H04L 25/02
  See application file for complete search history.

(56) References Cited

U.S. PATENT DOCUMENTS

| | | |
|---|---|---|
| 2011/0200127 A1 | 8/2011 | Lee et al. |
| 2012/0003981 A1 | 1/2012 | Krishnamurthy et al. |
| 2014/0098689 A1* | 4/2014 | Lee ...................... H04B 7/0469 370/252 |
| 2014/0274160 A1 | 9/2014 | Xiao et al. |
| 2015/0085838 A1 | 3/2015 | Benjebbour et al. |
| 2015/0236772 A1* | 8/2015 | Hammarwall ....... H04B 7/0617 370/329 |
| 2015/0264699 A1* | 9/2015 | Fwu ........................ H04L 5/003 370/329 |
| 2015/0373593 A1* | 12/2015 | Ryu .................. H04W 36/0083 370/332 |
| 2016/0021549 A1* | 1/2016 | Subramanian ........ H04W 16/28 370/329 |
| 2016/0056876 A1 | 2/2016 | Tanaka |
| 2016/0135090 A1* | 5/2016 | Krishnamoorthy ... H04W 16/28 370/329 |
| 2017/0318491 A1* | 11/2017 | Chen ..................... H04L 1/0026 |
| 2018/0049044 A1 | 2/2018 | Benjebbour et al. |

FOREIGN PATENT DOCUMENTS

| | | |
|---|---|---|
| CN | 103929383 | 7/2014 |
| JP | 2013-232741 A | 11/2013 |
| WO | 2010124241 A2 | 10/2010 |
| WO | 2012/148742 A2 | 11/2012 |
| WO | 2013161587 A1 | 10/2013 |
| WO | 2014/181441 A1 | 11/2014 |

OTHER PUBLICATIONS

"3rd Generation Partnership Project; Technical Specification Group Radio Access Network; Multiple-Input Multiple Output in UTRA," $3^{rd}$ Generation Partnership Project, 3GPP TR 25.876 v1.8.0, Oct. 14, 2005, 72 pgs.

Extended European Search Report dated Nov. 22, 2017 in corresponding European Patent Application No. 14909386.6.

Sony, *Indoor Positioning using Angle of Arrival (AoA)*, 3GPP TSG RAN WG1 Meeting #79, San Francisco, USA, Nov. 17-21, 2014, R1-145023, pp. 1-3.

Notice to Submit a Response, dated Jan. 19, 2018, in Korean Application No. 10-2017-7021408 (10 pp.).

Japanese Office Action dated Aug. 6, 2018 in corresponding Japanese Patent Application No. 2017-535390, 6 pgs.

CMCC, "High level view of 3D-MIMO schemes",3GPP TSG RAN WG1 Meeting #78bis R1-143955,Ljubljana, Slovenia, Oct. 6-10, 2014,total 2 pages.

Chinese Office Action dated Apr. 19, 2019 in Chinese Patent Application No. 201480084318.0 (6 pages).

* cited by examiner

METHOD FOR OBTAINING CHANNEL SPATIAL CHARACTERISTIC INFORMATION, AND BASE STATION

CROSS-REFERENCE TO RELATED APPLICATIONS

This application is a continuation of International Application No. PCT/CN2014/095620, filed on Dec. 30, 2014, the disclosure of which is hereby incorporated by reference in its entirety.

TECHNICAL FIELD

Embodiments of the present invention relate to communications technologies, and in particular, to a method for obtaining channel spatial characteristic information, and a base station.

BACKGROUND

With introduction of a massive multiple-input multiple-output (Massive Multiple Input Multiple Output, Massive MIMO for short) technology, there will be a sharply increasing quantity of base station antennas in the future, and therefore a base station has a more powerful multipath distinguishing capability, and more accurate and narrower beam transmission.

According to study, it is found that the massive MIMO technology may be introduced to a mobile communications system, so that the mobile communications system performs effective data transmission by using an advantage that a base station is capable of better distinguishing multipath at different angles.

However, to apply the massive MIMO technology to a system in which multiple base stations collaboratively communicate with user equipment (User Equipment, UE for short), a channel spatial characteristic with relatively high precision needs to be learned of. However, the channel spatial characteristic cannot be learned of by using the prior art.

SUMMARY

Embodiments of the present invention provide a method for obtaining channel spatial characteristic information, and a base station, so as to resolve a technical problem that a channel spatial characteristic cannot be learned of by using the prior art.

A first aspect of the embodiments of the present invention provides a method for obtaining channel spatial characteristic information, including:

separately sending, by a first base station, a channel spatial characteristic request and an identity of to-be-measured user equipment UE to multiple second base stations, where the channel spatial characteristic request is used to instruct the second base station to perform channel spatial characteristic information measurement on the to-be-measured UE; and receiving, by the first base station, channel spatial characteristic indication information sent by the multiple second base stations, where the channel spatial characteristic indication information carries channel spatial characteristic information of the to-be-measured UE, and the channel spatial characteristic information includes: angle information and spatial intensity information that are generated when a beam of the second base station arrives at the to-be-measured UE.

With reference to the first aspect, in a first possible implementation of the first aspect, after the receiving, by the first base station, channel spatial characteristic indication information sent by the multiple second base stations, the method further includes:

when the first base station determines, according to the channel spatial characteristic indication information and spatial channel quality information that are sent by the second base stations, that a second base station needs to perform data transmission for the to-be-measured UE, selecting, by the first base station, at least one second base station from the multiple second base stations as a data transmission base station according to the channel spatial characteristic indication information and the spatial channel quality information.

With reference to the first possible implementation of the first aspect, in a second possible implementation of the first aspect, the selecting, by the first base station, at least one second base station from the multiple second base stations as a data transmission base station according to the channel spatial characteristic indication information and the spatial channel quality information includes:

selecting, by the first base station from the multiple second base stations, a second base station whose channel spatial characteristic indication information is a line of sight and whose spatial channel quality parameter is greater than a preset threshold as the data transmission base station.

With reference to any one of the first aspect, or the first to the second possible implementations of the first aspect, in a third possible implementation of the first aspect, the channel spatial characteristic indication information is channel spatial dominate path characteristic indication information.

With reference to the third possible implementation of the first aspect, in a fourth possible implementation of the first aspect, the angle information generated when the beam of the second base station arrives at the to-be-measured UE includes: horizontal angle information generated when the beam of the second base station arrives at the to-be-measured UE and vertical angle information generated when the beam of the second base station arrives at the to-be-measured UE.

With reference to the third possible implementation of the first aspect, in a fifth possible implementation of the first aspect, the spatial intensity information includes: spatial intensity level information, or comparison information about whether a spatial intensity is greater than a preset threshold.

A second aspect of the embodiments of the present invention provides a method for obtaining channel spatial characteristic information, including:

receiving, by a second base station, a channel spatial characteristic request and an identity of to-be-measured user equipment UE that are sent by a first base station;

measuring, by the second base station, the to-be-measured UE according to the channel spatial characteristic request, so as to obtain channel spatial characteristic information; and sending, by the second base station, channel spatial characteristic indication information to the first base station, where the channel spatial characteristic indication information carries the channel spatial characteristic information of the to-be-measured UE, where the channel spatial characteristic information includes: angle information and spatial intensity information that are generated when a beam of the second base station arrives at the to-be-measured UE.

With reference to the second aspect, in a first possible implementation of the second aspect, the channel spatial characteristic indication information is channel spatial dominate path characteristic indication information.

With reference to the first possible implementation of the second aspect, in a second possible implementation of the second aspect, the angle information generated when the beam of the second base station arrives at the to-be-measured UE includes: horizontal angle information generated when the beam of the second base station arrives at the to-be-measured UE and vertical angle information generated when the beam of the second base station arrives at the to-be-measured UE.

With reference to the first possible implementation of the second aspect, in a third possible implementation of the second aspect, the spatial intensity information includes: spatial intensity level information, or comparison information about whether a spatial intensity is greater than a preset threshold.

A third aspect of the embodiments of the present invention provides a base station, where the base station is a first base station, including:

a sending module, configured to separately send a channel spatial characteristic request and an identity of to-be-measured user equipment UE to multiple second base stations, where the channel spatial characteristic request is used to instruct the second base station to perform channel spatial characteristic information measurement on the to-be-measured UE; and a receiving module, configured to receive channel spatial characteristic indication information sent by the multiple second base stations, where the channel spatial characteristic indication information carries channel spatial characteristic information of the to-be-measured UE, and the channel spatial characteristic information includes: angle information and spatial intensity information that are generated when a beam of the second base station arrives at the to-be-measured UE.

With reference to the third aspect, in a first possible implementation of the third aspect, the base station further includes:

a determining module, configured to: when determining, according to the channel spatial characteristic indication information and spatial channel quality information that are sent by the second base stations, that a second base station needs to perform data transmission for the to-be-measured UE, select at least one second base station from the multiple second base stations as a data transmission base station according to the channel spatial characteristic indication information and the spatial channel quality information.

With reference to the first possible implementation of the third aspect, in a second possible implementation of the third aspect, the determining module is specifically configured to select, from the multiple second base stations, a second base station whose channel spatial characteristic indication information is a line of sight and whose spatial channel quality parameter is greater than a preset threshold as the data transmission base station.

With reference to any one of the third aspect, or the first to the second possible implementations of the third aspect, in a third possible implementation of the third aspect, the channel spatial characteristic indication information is channel spatial dominate path characteristic indication information.

With reference to the third possible implementation of the third aspect, in a fourth possible implementation of the third aspect, the angle information generated when the beam of the second base station arrives at the to-be-measured UE includes: horizontal angle information generated when the beam of the second base station arrives at the to-be-measured UE and vertical angle information generated when the beam of the second base station arrives at the to-be-measured UE.

With reference to the third possible implementation of the third aspect, in a fifth possible implementation of the third aspect, the spatial intensity information includes: spatial intensity level information, or comparison information about whether a spatial intensity is greater than a preset threshold.

A fourth aspect of the embodiments of the present invention provides a base station, where the base station is a second base station, including:

a receiving module, configured to receive a channel spatial characteristic request and an identity of to-be-measured user equipment UE that are sent by a first base station;

a measurement module, configured to measure the to-be-measured UE according to the channel spatial characteristic request, so as to obtain channel spatial characteristic information; and a sending module, configured to send channel spatial characteristic indication information to the first base station, where the channel spatial characteristic indication information carries the channel spatial characteristic information of the to-be-measured UE, where the channel spatial characteristic information includes: angle information and spatial intensity information that are generated when a beam of the second base station arrives at the to-be-measured UE.

With reference to the fourth aspect, in a first possible implementation of the fourth aspect, the channel spatial characteristic indication information is channel spatial dominate path characteristic indication information.

With reference to the first possible implementation of the fourth aspect, in a second possible implementation of the fourth aspect, the angle information generated when the beam of the second base station arrives at the to-be-measured UE includes: horizontal angle information generated when the beam of the second base station arrives at the to-be-measured UE and vertical angle information generated when the beam of the second base station arrives at the to-be-measured UE.

With reference to the first possible implementation of the fourth aspect, in a third possible implementation of the fourth aspect, the spatial intensity information includes: spatial intensity level information, or comparison information about whether a spatial intensity is greater than a preset threshold.

A fifth aspect of the embodiments of the present invention provides a base station, where the base station is a first base station, including:

a transmitter, configured to separately send a channel spatial characteristic request and an identity of to-be-measured user equipment UE to multiple second base stations, where the channel spatial characteristic request is used to instruct the second base station to perform channel spatial characteristic information measurement on the to-be-measured UE; and a receiver, configured to receive channel spatial characteristic indication information sent by the multiple second base stations, where the channel spatial characteristic indication information carries channel spatial characteristic information of the to-be-measured UE, and the channel spatial characteristic information includes: angle information and spatial intensity information that are generated when a beam of the second base station arrives at the to-be-measured UE.

With reference to the fifth aspect, in a first possible implementation of the fifth aspect, the base station further includes:

a processor, configured to: when determining, according to the channel spatial characteristic indication information and spatial channel quality information that are sent by the second base stations, that a second base station needs to perform data transmission for the to-be-measured UE, select at least one second base station from the multiple second base stations as a data transmission base station according to the channel spatial characteristic indication information and the spatial channel quality information.

With reference to the first possible implementation of the fifth aspect, in a second possible implementation of the fifth aspect, the processor is specifically configured to select, from the multiple second base stations, a second base station whose channel spatial characteristic indication information is a line of sight and whose spatial channel quality parameter is greater than a preset threshold as the data transmission base station.

With reference to any one of the fifth aspect, or the first to the second possible implementations of the fifth aspect, in a third possible implementation of the fifth aspect, the channel spatial characteristic indication information is channel spatial dominate path characteristic indication information.

With reference to the third possible implementation of the fifth aspect, in a fourth possible implementation of the fifth aspect, the angle information generated when the beam of the second base station arrives at the to-be-measured UE includes: horizontal angle information generated when the beam of the second base station arrives at the to-be-measured UE and vertical angle information generated when the beam of the second base station arrives at the to-be-measured UE.

With reference to the third possible implementation of the fifth aspect, in a fifth possible implementation of the fifth aspect, the spatial intensity information includes: spatial intensity level information, or comparison information about whether a spatial intensity is greater than a preset threshold.

A sixth aspect of the embodiments of the present invention provides a base station, where the base station is a second base station, including:

a receiver, configured to receive a channel spatial characteristic request and an identity of to-be-measured user equipment UE that are sent by a first base station;

a processor, configured to measure the to-be-measured UE according to the channel spatial characteristic request, so as to obtain channel spatial characteristic information; and a transmitter, configured to send channel spatial characteristic indication information to the first base station, where the channel spatial characteristic indication information carries the channel spatial characteristic information of the to-be-measured UE, where the channel spatial characteristic information includes: angle information and spatial intensity information that are generated when a beam of the second base station arrives at the to-be-measured UE.

With reference to the sixth aspect, in a first possible implementation of the sixth aspect, the channel spatial characteristic indication information is channel spatial dominate path characteristic indication information.

With reference to the first possible implementation of the sixth aspect, in a second possible implementation of the sixth aspect, the angle information generated when the beam of the second base station arrives at the to-be-measured UE includes:

horizontal angle information generated when the beam of the second base station arrives at the to-be-measured UE and vertical angle information generated when the beam of the second base station arrives at the to-be-measured UE.

With reference to the first possible implementation of the sixth aspect, in a third possible implementation of the sixth aspect, the spatial intensity information includes: spatial intensity level information, or comparison information about whether a spatial intensity is greater than a preset threshold.

In the method for obtaining channel spatial characteristic information, and the base station provided in the embodiments of the present invention, a first base station separately sends a channel spatial characteristic request and an identity of to-be-measured UE to multiple second base stations, so as to instruct the second base station to measure spatial characteristic information measurement of the to-be-measured UE; after the second base station returns channel spatial characteristic indication information that includes channel spatial characteristic information of the to-be-measured UE to the first base station, the channel spatial characteristic information can be obtained on all channels through which the first base station and the second base station communicate with the UE. Therefore, multipath at different angles or in different directions can be better distinguished, so that interference between multiple users is better avoided in a data transmission process by using this advantage for data transmission, and a massive MIMO technology is well applied to a system in which multiple base stations collaboratively communicate with UE.

DESCRIPTION OF EMBODIMENTS

Figure 1:
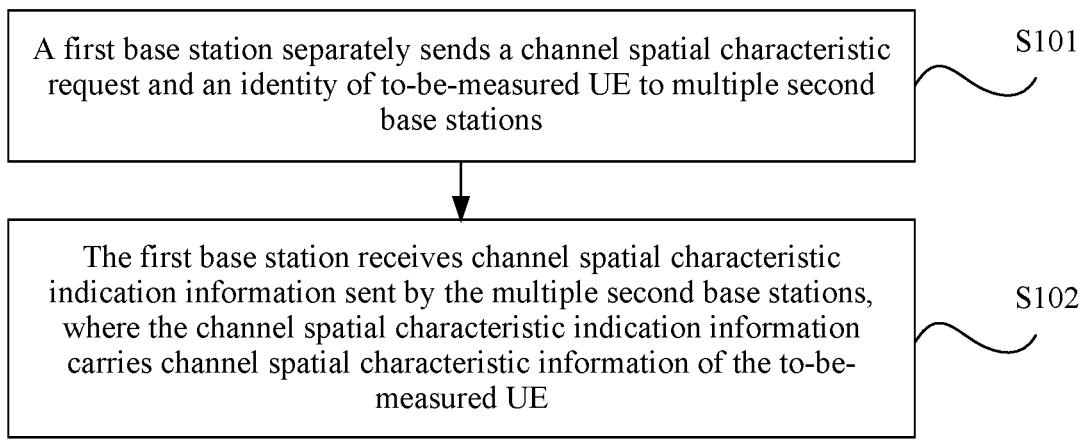
FIG. 1 is a schematic flowchart of Embodiment 1 of a method for obtaining channel spatial characteristic information according to the present invention.

FIG. 1 is a schematic flowchart of Embodiment 1 of a method for obtaining channel spatial characteristic information according to the present invention. As shown in FIG. 1, the method includes the following steps.

S101. A first base station separately sends a channel spatial characteristic request and an identity of to-be-measured UE to multiple second base stations.

The channel spatial characteristic request is used to instruct the second base station to perform channel spatial characteristic information measurement on the to-be-measured UE. That is, after receiving the channel spatial characteristic request, each second base station starts to measure channel spatial characteristic information of the to-be-measured UE.

For example, in a frequency division duplex (Frequency Division Duplexing, FDD for short) or time division duplex (Time Division Duplexing, TDD for short) system, the second base station may measure the channel spatial characteristic information of the UE by monitoring an uplink sounding (sounding) signal sent by the UE.

S102. The first base station receives channel spatial characteristic indication information sent by the multiple second base stations, where the channel spatial characteristic indication information carries channel spatial characteristic information of the to-be-measured UE.

Specifically, the channel spatial characteristic information includes: angle information and spatial intensity information that are generated when a beam of the second base station arrives at the to-be-measured UE.

In a specific implementation process, that the second base station obtains the angle information generated when the beam of the second base station arrives at the to-be-measured UE may be that the second base station directly obtains, by means of measurement, an angle generated when the beam arrives at the to-be-measured UE, or may be that the second base station obtains, by means of measurement, spatial angle spectrum estimation. The spatial angle spectrum estimation includes more complete information, so that specific beam arrival-of-angle information may be further obtained according to the spatial angle spectrum estimation.

The channel spatial characteristic indication information may be channel spatial dominate path (Dominate Path) characteristic indication information. Certainly, this is not limited herein. Alternatively, the channel spatial characteristic indication information may be line-of-sight characteristic indication information with a relatively high intensity, or the like.

When the channel spatial characteristic indication information is the channel spatial dominate path characteristic indication information, the spatial intensity information is spatial dominate path intensity information.

It should be noted that a specific implementation after a massive MIMO technology is introduced to a multi-base station collaboration solution is mainly described in the embodiment of the present. After the massive MIMO technology is introduced to a system in which multiple base stations collaboratively communicate with UE, a base station can better distinguish multipath at different angles or in different directions. Particularly, when channels between a base station and some UE show a relatively powerful multipath energy at several specific angles or in several specific directions, data transmission can be quite effectively performed by using this characteristic.

In an implementation process, such beamforming (beamforming) based on some directions of a relatively powerful multipath energy has the following advantages: (1) A channel obtaining manner is simple. Specifically, beamforming can be performed, provided that a base station obtains, by means of estimation, an angle or a direction having a dominate path channel. Specifically, the channel obtaining manner is generally obtained based on a long-term channel response. Therefore, a high-density pilot signal for obtaining instantaneous channel information is not required. In addition, this dominate path channel characteristic may be obtained by means of reciprocity between an uplink channel and a downlink channel between UE and a base station, thereby causing extremely low pilot overheads. (2) Interference between multiple users is controllable. A beam direction and a beam width of a base station can be well controlled by using the beamforming solution based on the foregoing channel obtaining manner, so as to well control transmission interference between multiple users, that is, interference between downlink signals from multiple base stations to UE is avoided.

Therefore, when a channel characteristic between a base station and UE shows a dominate path channel characteristic, the foregoing multi-base station collaboration transmission manner is most suitable.

After the foregoing steps are completed, the channel spatial characteristic information can be obtained on all channels through which the first base station and the second base station communicate with the UE. After obtaining the angle information generated when a beam of each of the second base stations arrives at the to-be-measured UE, the first base station may exert better control in a subsequent data transmission process, so as to avoid interference between downlink signals from multiple base stations to the UE.

In this embodiment, a first base station separately sends a channel spatial characteristic request and an identity of to-be-measured UE to multiple second base stations, so as to instruct the second base station to obtain, by means of measurement, spatial characteristic information measurement of the to-be-measured UE; after the second base station returns channel spatial characteristic indication information that includes channel spatial characteristic information of the to-be-measured UE to the first base station, the channel spatial characteristic information can be obtained on all channels through which the first base station and the second base station communicate with the UE. Therefore, multipath at different angles or in different directions can be better distinguished, so that interference between multiple users is better avoided in a data transmission process by using this advantage for data transmission, and a massive MIMO technology is well applied to a system in which multiple base stations collaboratively communicate with UE.

Based on the foregoing embodiment, after receiving the channel spatial characteristic indication information sent by the multiple second base stations, when the first base station determines, according to the channel spatial characteristic indication information and spatial channel quality information that are sent by the second base stations, that it is necessary to select a second base station to perform data transmission for the to-be-measured UE, the first base station selects at least one second base station from the multiple second base stations as a data transmission base station according to the channel spatial characteristic indication information and the spatial channel quality information. Then, the first base station and the second base station that acts as the data transmission base station collaboratively perform data transmission.

Specifically, the first base station determines, whether it is necessary to select a second base station to perform data transmission for the to-be-measured UE, mainly according to the spatial intensity information in the channel spatial characteristic indication information sent by the second base stations. For example, if there is spatial intensity information, meeting a preset condition, in the spatial intensity information sent by the multiple second base stations, the first base station selects a data transmission base station from the multiple second base stations, or if none of the spatial intensity information sent by the multiple second base stations meets a preset condition, no data transmission base station is selected.

The second base station is a collaborative base station of the first base station. Information is transmitted between the first base station and the second base stations by using a communications interface. It should be noted that channel spatial characteristic indication information is configured on the communications interface.

Specifically, in this embodiment, the first base station is a base station that can determine a data transmission base station, and the second base station is used as a candidate base station of the data transmission base station.

Further, a second base station meeting the preset condition may be selected as the data transmission base station according to the channel spatial characteristic indication and channel quality information that are sent by the second base stations. However, this is not limited herein. In a specific implementation process, that the first base station selects at least one second base station from the multiple second base stations as a data transmission base station according to the channel spatial characteristic indication information and spatial channel quality information is specifically as follows: The first base station selects, from the multiple second base stations, a second base station whose channel spatial characteristic indication information is a line of sight (line of sight, LOS for short) and whose spatial channel quality parameter is greater than a preset threshold as the data transmission base station.

The spatial channel quality parameter may be reference signal received quality (Reference Signal Receiving Quality, RSRQ for short).

Specifically, the angle information generated when the beam of the second base station arrives at the to-be-measured UE includes: horizontal angle information generated when the beam of the second base station arrives at the to-be-measured UE and vertical angle information generated when the beam of the second base station arrives at the to-be-measured UE.

The spatial intensity information includes: spatial intensity level information, or comparison information about whether a spatial intensity is greater than a preset threshold. In a specific implementation process, it may be pre-configured whether the spatial intensity level information is to be carried or the comparison information about whether a spatial intensity is greater than a preset threshold is to be carried. If the spatial intensity level information is carried, parameters of different levels are preset; or if the comparison information about whether a spatial intensity is greater than a preset threshold is carried, the preset threshold is configured in advance. The preset threshold is used to determine whether a spatial intensity is strong or weak.

When the channel spatial characteristic indication information is channel spatial dominate path characteristic indication information, the spatial intensity information may specifically include: spatial dominate path intensity level information, or comparison information about whether a spatial dominate path intensity is greater than a preset threshold.

More preferably, the communications interface is an X2 interface. It should be noted that a channel spatial characteristic is a slowly-changing characteristic. The channel spatial characteristic is hundreds of milliseconds (ms) or even longer, and is suitable for transmission by using the X2 interface. Certainly, this is not limited herein.

In addition, the foregoing embodiment may be applied to different systems, such as a homogeneous system or a heterogeneous system.

Figure 2:
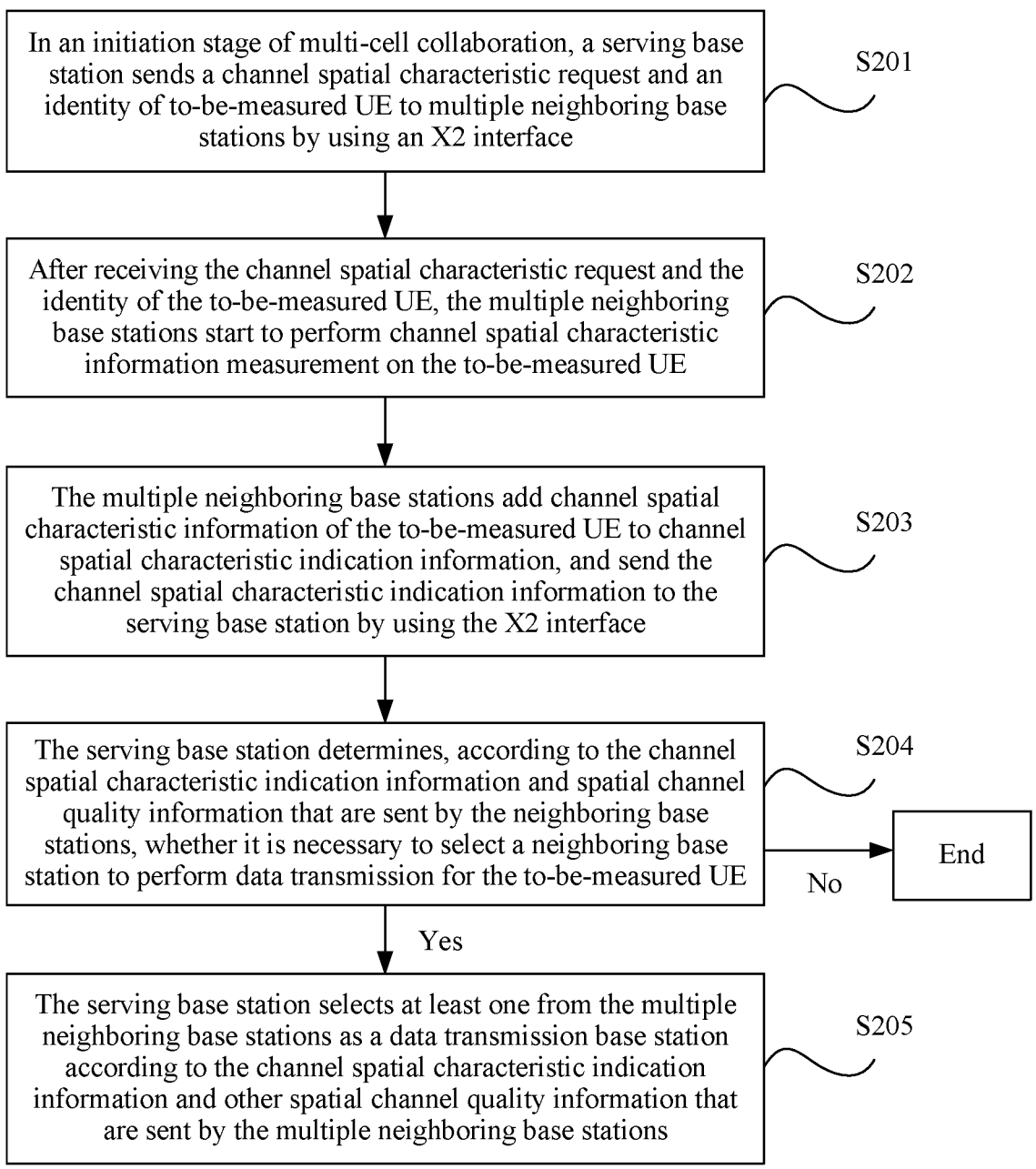
FIG. 2 is a schematic flowchart of Embodiment 2 of a method for obtaining channel spatial characteristic information according to the present invention.
Figure 3:
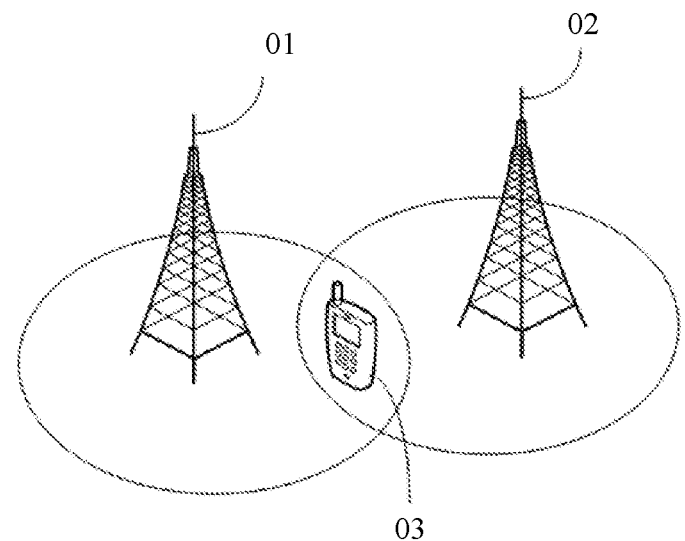
FIG. 3 is a schematic structural diagram of a homogeneous system in a multi-base station collaboration scenario in Embodiment 3 of a method for obtaining channel spatial characteristic information according to the present invention.
Figure 4:
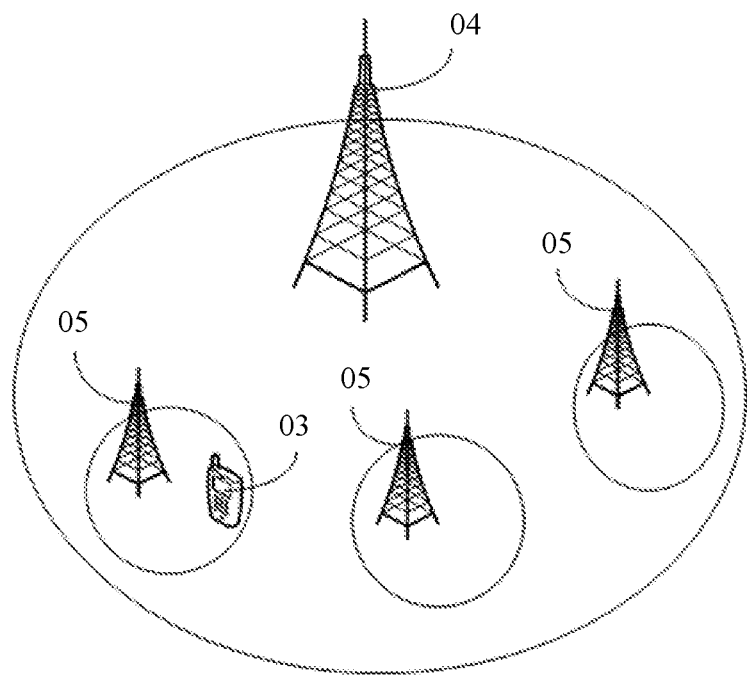
FIG. 4 is a schematic structural diagram of a heterogeneous system in a multi-base station collaboration scenario in Embodiment 4 of a method for obtaining channel spatial characteristic information according to the present invention.

FIG. 2 is a schematic flowchart of Embodiment 2 of a method for obtaining channel spatial characteristic information according to the present invention. FIG. 3 is a schematic structural diagram of a homogeneous system in a multi-base station collaboration scenario in Embodiment 3 of a method for obtaining channel spatial characteristic information according to the present invention. FIG. 4 is a schematic structural diagram of a heterogeneous system in a multi-base station collaboration scenario in Embodiment 4 of a method for obtaining channel spatial characteristic information according to the present invention. Circles in FIG. 3 and FIG. 4 represent coverage areas of base stations.

Referring to FIG. 3, in a homogeneous (Homogeneous) system, the foregoing first base station is a serving base station (Serving eNodeB) 01. The second base station is a neighboring base station (Neighboring eNodeB) 02 of the first base station. Both the serving base station 01 and the neighboring base station 02 of the base station may exchange information with UE 03.

As shown in FIG. 2, a "neighboring base station" in FIG. 2 represents one of multiple neighboring base stations. Using an X2 interface as an example, the method includes:

S201. In an initiation stage of multi-cell collaboration, a serving base station sends a channel spatial characteristic request and an identity of to-be-measured UE to multiple neighboring base stations by using an X2 interface.

The multiple neighboring base stations are collaborative base stations of the serving base station.

S202. After receiving the channel spatial characteristic request and the identity of the to-be-measured UE, the multiple neighboring base stations start to perform channel spatial characteristic information measurement on the to-be-measured UE. Specifically, channel spatial characteristic information of the UE may be measured by monitoring uplink sounding information sent by the UE.

S203. The multiple neighboring base stations add the channel spatial characteristic information of the to-be-measured UE to channel spatial characteristic indication information, and send the channel spatial characteristic indication information to the serving base station by using the X2 interface.

Specifically, the neighboring base stations send the channel spatial characteristic information of the to-be-measured UE on the X2 interface according to a format of the "channel spatial characteristic indication" information.

S204. The serving base station determines, according to the channel spatial characteristic indication information and spatial channel quality information that are sent by the neighboring base stations, whether it is necessary to select a neighboring base station to perform data transmission for the to-be-measured UE. If it is necessary to select a neighboring base station, perform S205; or if it is unnecessary to select a neighboring base station, end the process.

S205. The serving base station selects at least one from the multiple neighboring base stations as a data transmission base station according to the channel spatial characteristic indication information and other spatial channel quality information that are sent by the multiple neighboring base stations.

In the homogeneous system, the serving base station is generally a base station (eNodeB) accessed by the UE. The serving base station is responsible for control information transmission, broadcast information transmission, handover, and the like for the UE.

Referring to FIG. 4, in a heterogeneous system, the foregoing first base station is a macro base station (Macro eNodeB) 04. The second base station is a pico base station (Pico eNodeB) 05 in a coverage area of the first base station. Both the macro base station 04 and the pico base station 05 may exchange information with UE 03.

For the heterogeneous system, the serving base station in the embodiment shown in FIG. 2 is replaced with the macro eNodeB, and the neighboring base station is replaced with the pico eNodeB. Similarly, in the heterogeneous system, the macro base station is generally a base station (eNodeB) accessed by the UE. The serving base station is responsible for control information transmission, broadcast information transmission, handover, and the like for the UE.

Figure 5:
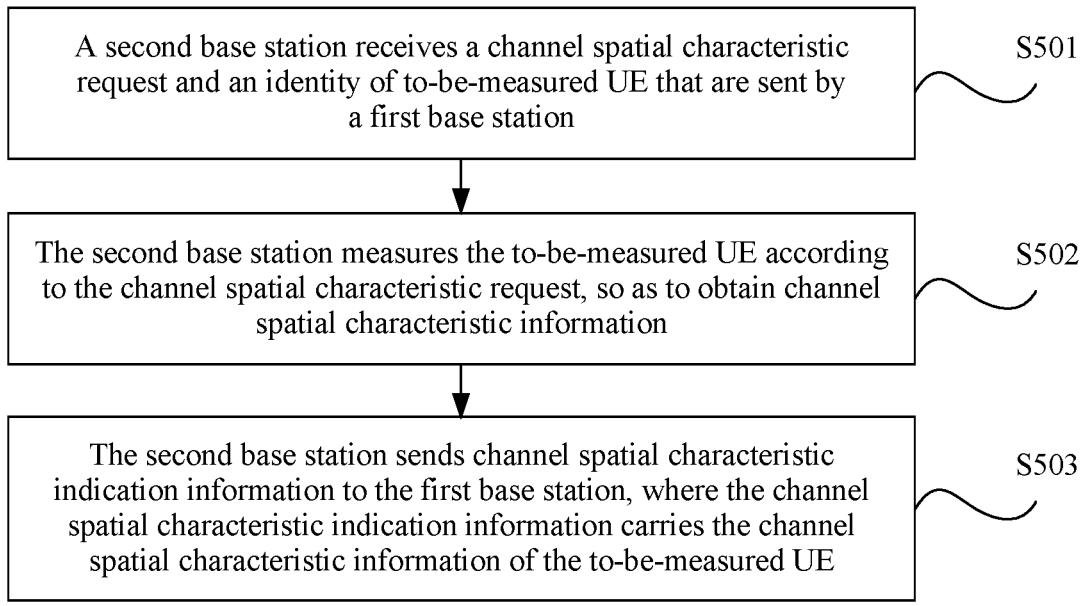
FIG. 5 is a schematic flowchart of Embodiment 5 of a method for obtaining channel spatial characteristic information according to the present invention.

FIG. 5 is a schematic flowchart of Embodiment 5 of a method for obtaining channel spatial characteristic information according to the present invention.

The method is performed by the foregoing second base station. Corresponding to the foregoing embodiment, the method includes:

S501. The second base station receives a channel spatial characteristic request and an identity of to-be-measured UE that are sent by a first base station.

S502. The second base station measures the to-be-measured UE according to the channel spatial characteristic request, so as to obtain channel spatial characteristic information.

S503. The second base station sends channel spatial characteristic indication information to the first base station, where the channel spatial characteristic indication information carries the channel spatial characteristic information of the to-be-measured UE.

The channel spatial characteristic information includes: angle information and spatial intensity information that are generated when a beam of the second base station arrives at the to-be-measured UE.

Specifically, as described in the foregoing embodiment, if the first base station determines that it is necessary to select a second base station as a data transmission base station, the first base station selects the data transmission base station from the multiple second base stations according to the channel spatial characteristic indication information and with reference to other spatial channel quality information.

In the foregoing embodiment, the second base station is a collaborative base station of the first base station. Information is transmitted between the first base station and the second base stations by using a communications interface. Channel spatial characteristic indication information is configured on the communications interface.

In this embodiment, a second base station measures spatial characteristic information of to-be-measured UE according to a channel spatial characteristic request and an identity of the to-be-measured UE that are sent by a first base station, and returns channel spatial characteristic indication information that includes the channel spatial characteristic information of the to-be-measured UE to the first base station. In this case, the channel spatial characteristic information can be obtained on all channels through which the first base station and the second base station communicate with the UE. Therefore, multipath at different angles or in different directions can be better distinguished, so that interference between multiple users is better avoided in a data transmission process by using this advantage for data transmission, and a massive MIMO technology is well applied to a system in which multiple base stations collaboratively communicate with UE.

The channel spatial characteristic indication information may be channel spatial dominate path (Dominate Path) characteristic indication information. Certainly, this is not limited herein. Alternatively, the channel spatial characteristic indication information may be line-of-sight characteristic indication information with a relatively high intensity, or the like.

When the channel spatial characteristic indication information is the channel spatial dominate path characteristic indication information, the spatial intensity information is spatial dominate path intensity information.

Specifically, the angle information generated when the beam of the second base station arrives at the to-be-measured UE includes: horizontal angle information generated when the beam of the second base station arrives at the to-be-measured UE and vertical angle information generated when the beam of the second base station arrives at the to-be-measured UE.

The spatial intensity information includes: spatial intensity level information, or comparison information about whether a spatial intensity is greater than a preset threshold. In a specific implementation process, it may be pre-configured whether the spatial intensity level information is to be carried or the comparison information about whether a spatial intensity is greater than a preset threshold is to be carried. If the spatial intensity level information is carried, parameters of different levels are preset; or if the comparison information about whether a spatial intensity is greater than a preset threshold is carried, the preset threshold is configured in advance. The preset threshold is used to determine whether a spatial intensity is strong or weak.

More preferably, the communications interface is an X2 interface.

In another embodiment, in a homogeneous system, the foregoing first base station is a serving base station (Serving eNodeB), and the second base station is a neighboring base station (Neighboring eNodeB) of the foregoing first base station.

In a heterogeneous system, the foregoing first base station is a macro base station (Macro eNodeB), and the second base station is a pico base station (Pico eNodeB) in a coverage area of the first base station.

For a specific implementation process, refer to the foregoing embodiment. Details are not described herein.

Figure 6:
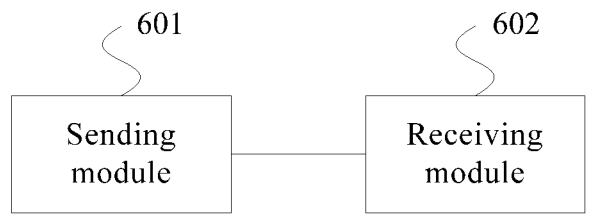
FIG. 6 is a schematic structural diagram of Embodiment 1 of a base station according to the present invention.

FIG. 6 is a schematic structural diagram of Embodiment 1 of a base station according to the present invention. The base station is the foregoing first base station, and specifically includes: a sending module 601 and a receiving module 602.

The sending module 601 is configured to separately send a channel spatial characteristic request and an identity of to-be-measured user equipment UE to multiple second base stations, where the channel spatial characteristic request is used to instruct the second base station to perform channel spatial characteristic information measurement on the to-be-measured UE.

The receiving module 602 is configured to receive channel spatial characteristic indication information sent by the multiple second base stations, where the channel spatial characteristic indication information carries channel spatial characteristic information of the to-be-measured UE, and the channel spatial characteristic information includes: angle information and spatial intensity information that are generated when a beam of the second base station arrives at the to-be-measured UE.

In this embodiment, a first base station separately sends a channel spatial characteristic request and an identity of to-be-measured UE to multiple second base stations, so as to instruct the second base station to obtain, by means of measurement, spatial characteristic information measurement of the to-be-measured UE; after the second base station returns channel spatial characteristic indication information that includes channel spatial characteristic information of the to-be-measured UE to the first base station, the channel spatial characteristic information can be obtained on all channels through which the first base station and the second base station communicate with the UE. Therefore, multipath at different angles or in different directions can be better distinguished, so that interference between multiple users is better avoided in a data transmission process by using this advantage for data transmission, and a massive MIMO technology is well applied to a system in which multiple base stations collaboratively communicate with UE.

Figure 7:
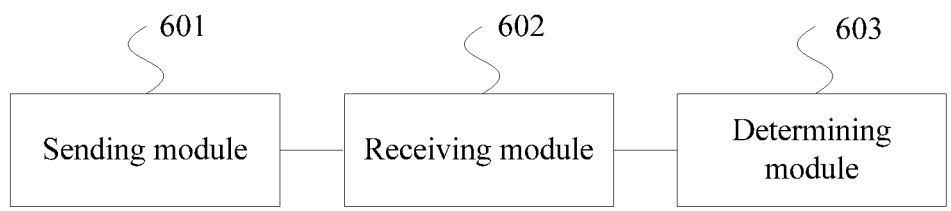
FIG. 7 is a schematic structural diagram of Embodiment 2 of a base station according to the present invention.

FIG. 7 is a schematic structural diagram of Embodiment 2 of a base station according to the present invention. Based on FIG. 6, the base station further includes: a determining module 603, configured to: when determining, according to the channel spatial characteristic indication information and spatial channel quality information that are sent by the second base stations, that a second base station needs to perform data transmission for the to-be-measured UE, select at least one second base station from the multiple second base stations as a data transmission base station according to the channel spatial characteristic indication information and the spatial channel quality information.

More specifically, the determining module 603 selects, from the multiple second base stations, a second base station whose channel spatial characteristic indication information is a line of sight and whose spatial channel quality parameter is greater than a preset threshold as the data transmission base station.

Optionally, the channel spatial characteristic indication information is channel spatial dominate path characteristic indication information.

The angle information generated when the beam of the second base station arrives at the to-be-measured UE includes: horizontal angle information generated when the beam of the second base station arrives at the to-be-measured UE and vertical angle information generated when the beam of the second base station arrives at the to-be-measured UE.

The spatial intensity information includes: spatial intensity level information, or comparison information about whether a spatial intensity is greater than a preset threshold.

Figure 8:
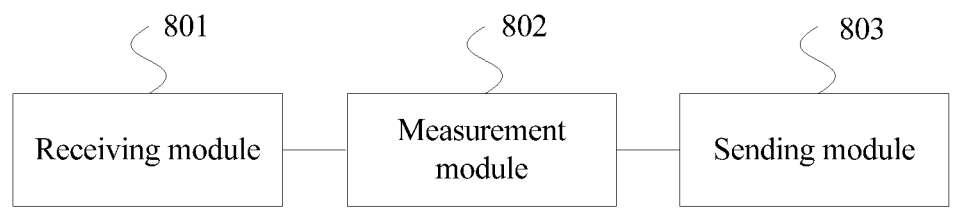
FIG. 8 is a schematic structural diagram of Embodiment 3 of a base station according to the present invention.

FIG. 8 is a schematic structural diagram of Embodiment 3 of a base station according to the present invention. The base station in this embodiment is the foregoing second base station, and specifically includes: a receiving module 801, a measurement module 802, and a sending module 803.

The receiving module 801 is configured to receive a channel spatial characteristic request and an identity of to-be-measured user equipment UE that are sent by a first base station.

The measurement module 802 is configured to measure the to-be-measured UE according to the channel spatial characteristic request, so as to obtain channel spatial characteristic information.

The sending module 803 is configured to send channel spatial characteristic indication information to the first base station, where the channel spatial characteristic indication information carries the channel spatial characteristic information of the to-be-measured UE, where the channel spatial characteristic information includes: angle information and spatial intensity information that are generated when a beam of the second base station arrives at the to-be-measured UE.

In this embodiment, a second base station measures spatial characteristic information of to-be-measured UE according to a channel spatial characteristic request and an identity of the to-be-measured UE that are sent by a first base station, and returns channel spatial characteristic indication information that includes channel spatial characteristic information of the to-be-measured UE to the first base station. In this case, the channel spatial characteristic information can be obtained on all channels through which the first base station and the second base station communicate with the UE. Therefore, multipath at different angles or in different directions can be better distinguished, so that interference between multiple users is better avoided in a data transmission process by using this advantage for data transmission, and a massive MIMO technology is well applied to a system in which multiple base stations collaboratively communicate with UE.

Further, the channel spatial characteristic indication information is channel spatial dominate path characteristic indication information.

The angle information generated when the beam of the second base station arrives at the to-be-measured UE includes: horizontal angle information generated when the beam of the second base station arrives at the to-be-measured UE and vertical angle information generated when the beam of the second base station arrives at the to-be-measured UE.

The spatial intensity information includes: spatial intensity level information, or comparison information about whether a spatial intensity is greater than a preset threshold.

Figure 9:
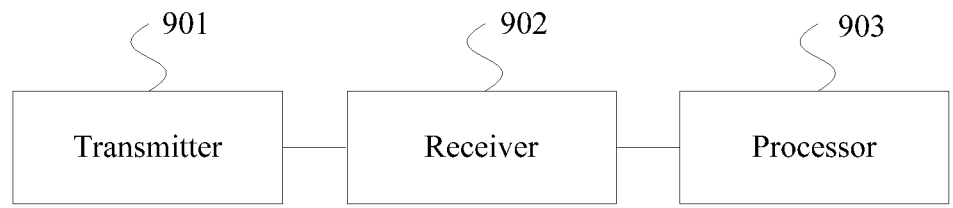
FIG. 9 is a schematic structural diagram of Embodiment 4 of a base station according to the present invention.

FIG. 9 is a schematic structural diagram of Embodiment 4 of a base station according to the present invention. The base station in this embodiment is the foregoing first base station, and specifically includes: a transmitter 901 and a receiver 902.

The transmitter 901 is configured to separately send a channel spatial characteristic request and an identity of to-be-measured user equipment UE to multiple second base stations, where the channel spatial characteristic request is used to instruct the second base station to perform channel spatial characteristic information measurement on the to-be-measured UE.

The receiver 902 is configured to receive channel spatial characteristic indication information sent by the multiple second base stations, where the channel spatial characteristic indication information carries channel spatial characteristic information of the to-be-measured UE, and the channel spatial characteristic information includes: angle information and spatial intensity information that are generated when a beam of the second base station arrives at the to-be-measured UE.

In this embodiment, a first base station separately sends a channel spatial characteristic request and an identity of to-be-measured UE to multiple second base stations, so as to instruct the second base station to obtain, by means of measurement, spatial characteristic information measurement of the to-be-measured UE; after the second base station returns channel spatial characteristic indication information that includes channel spatial characteristic information of the to-be-measured UE to the first base station, the channel spatial characteristic information can be obtained on all channels through which the first base station and the second base station communicate with the UE. Therefore, multipath at different angles or in different directions can be better distinguished, so that interference between multiple users is better avoided in a data transmission process by using this advantage for data transmission, and a massive MIMO technology is well applied to a system in which multiple base stations collaboratively communicate with UE.

Referring to FIG. 9, the base station further includes: a processor 903, configured to: when determining, according to the channel spatial characteristic indication information and spatial channel quality information that are sent by the second base stations, that a second base station needs to perform data transmission for the to-be-measured UE, select at least one second base station from the multiple second base stations as a data transmission base station according to the channel spatial characteristic indication information and the spatial channel quality information.

The processor 903 is specifically configured to select, from the multiple second base stations, a second base station whose channel spatial characteristic indication information is a line of sight and whose spatial channel quality parameter is greater than a preset threshold as the data transmission base station.

The channel spatial characteristic indication information may be channel spatial dominate path characteristic indication information.

The angle information generated when the beam of the second base station arrives at the to-be-measured UE includes: horizontal angle information generated when the beam of the second base station arrives at the to-be-measured UE and vertical angle information generated when the beam of the second base station arrives at the to-be-measured UE.

The spatial intensity information includes: spatial intensity level information, or comparison information about whether a spatial intensity is greater than a preset threshold.

The base station is configured to implement the foregoing method embodiment. Implementation principles and technical effects of the base station are similar to those in the method embodiment. Details are not described herein.

Figure 10:
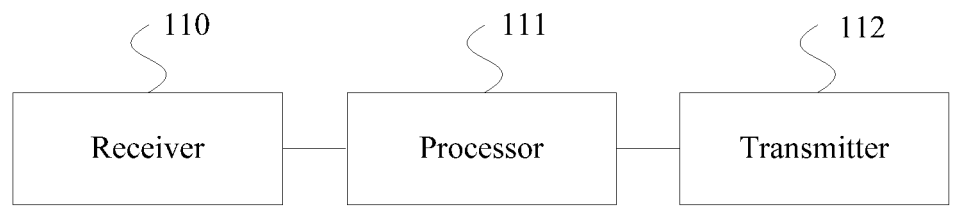
FIG. 10 is a schematic structural diagram of Embodiment 5 of a base station according to the present invention.

FIG. 10 is a schematic structural diagram of Embodiment 5 of a base station according to the present invention. The base station in this embodiment is the foregoing second base station, and specifically includes: a receiver 110, a processor 111, and a transmitter 112.

The receiver 110 is configured to receive a channel spatial characteristic request and an identity of to-be-measured user equipment UE that are sent by a first base station.

The processor 111 is configured to measure the to-be-measured UE according to the channel spatial characteristic request, so as to obtain channel spatial characteristic information.

The transmitter 112 is configured to send channel spatial characteristic indication information to the first base station, where the channel spatial characteristic indication information carries the channel spatial characteristic information of the to-be-measured UE, where the channel spatial characteristic information includes: angle information and spatial intensity information that are generated when a beam of the second base station arrives at the to-be-measured UE.

The base station is configured to implement the foregoing method embodiment. Implementation principles and technical effects of the base station are similar to those in the method embodiment. Details are not described herein.

The channel spatial characteristic indication information may be channel spatial dominate path characteristic indication information.

The angle information generated when the beam of the second base station arrives at the to-be-measured UE includes: horizontal angle information generated when the beam of the second base station arrives at the to-be-measured UE and vertical angle information generated when the beam of the second base station arrives at the to-be-measured UE.

The spatial intensity information includes: spatial intensity level information, or comparison information about whether a spatial intensity is greater than a preset threshold.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for obtaining channel spatial characteristic information, comprising:
   separately sending, by a first base station, a channel spatial characteristic request and an identity of to-be-measured user equipment (UE) to multiple second base stations, wherein the channel spatial characteristic request is used to instruct the second base station to perform channel spatial characteristic information measurement on the to-be-measured UE;
   receiving, by the first base station, channel spatial characteristic indication information sent by the multiple second base stations, wherein the channel spatial characteristic indication information carries channel spatial characteristic information of the to-be-measured UE, and the channel spatial characteristic information comprises: angle information and spatial intensity information that are generated when a beam of the second base station arrives at the to-be-measured UE; and
   determining, by the first base station, a second base station is to perform data transmission for the to-be-measured UE based on the channel spatial characteristic indication information and spatial channel quality information that are sent by the second base stations.

2. The method according to claim 1, wherein after the receiving, by the first base station, channel spatial characteristic indication information sent by the multiple second base stations, the method further comprises:
   when the first base station determines, according to the channel spatial characteristic indication information and the spatial channel quality information that are sent by the second base stations, that a second base station is to perform data transmission for the to-be-measured UE, selecting, by the first base station, at least one second base station from the multiple second base stations as a data transmission base station according to the channel spatial characteristic indication information and the spatial channel quality information.

3. The method according to claim 2, wherein the selecting, by the first base station, at least one second base station from the multiple second base stations as a data transmission base station according to the channel spatial characteristic indication information and the spatial channel quality information comprises:
selecting, by the first base station from the multiple second base stations, a second base station whose channel spatial characteristic indication information is a line of sight and whose spatial channel quality parameter is greater than a preset threshold as the data transmission base station.

4. The method according to claim 1, wherein the channel spatial characteristic indication information is channel spatial dominate path characteristic indication information.

5. The method according to claim 4, wherein the angle information generated when the beam of the second base station arrives at the to-be-measured UE comprises: horizontal angle information generated when the beam of the second base station arrives at the to-be-measured UE and vertical angle information generated when the beam of the second base station arrives at the to-be-measured UE.

6. The method according to claim 4, wherein the spatial intensity information comprises: spatial intensity level information, or comparison information about whether a spatial intensity is greater than a preset threshold.

7. A method for obtaining channel spatial characteristic information, comprising:
receiving, by a second base station, a channel spatial characteristic request and an identity of to-be-measured user equipment (UE) that are sent by a first base station;
measuring, by the second base station, the to-be-measured UE according to the channel spatial characteristic request, so as to obtain channel spatial characteristic information; and
sending, by the second base station, channel spatial characteristic indication information and spatial channel quality information to the first base station so the first base station determines a second base station is to perform data transmission for the to-be-measured UE based on the channel spatial characteristic indication information and the spatial channel quality information, wherein the channel spatial characteristic indication information carries the channel spatial characteristic information of the to-be-measured UE, wherein the channel spatial characteristic information comprises: angle information and spatial intensity information that are generated when a beam of the second base station arrives at the to-be-measured UE.

8. The method according to claim 7, wherein the channel spatial characteristic indication information is channel spatial dominate path characteristic indication information.

9. The method according to claim 8, wherein the angle information generated when the beam of the second base station arrives at the to-be-measured UE comprises: horizontal angle information generated when the beam of the second base station arrives at the to-be-measured UE and vertical angle information generated when the beam of the second base station arrives at the to-be-measured UE.

10. The method according to claim 8, wherein the spatial intensity information comprises: spatial intensity level information, or comparison information about whether a spatial intensity is greater than a preset threshold.

11. A base station, wherein the base station is a first base station, comprising:
a transmitter, configured to separately send a channel spatial characteristic request and an identity of to-be-measured user equipment (UE) to multiple second base stations, wherein the channel spatial characteristic request is used to instruct the second base station to perform channel spatial characteristic information measurement on the to-be-measured UE;
a receiver, configured to receive channel spatial characteristic indication information sent by the multiple second base stations, wherein the channel spatial characteristic indication information carries channel spatial characteristic information of the to-be-measured UE, and the channel spatial characteristic information comprises: angle information and spatial intensity information that are generated when a beam of the second base station arrives at the to-be-measured UE; and
a processor, configured to determine a second base station is to perform data transmission for the to-be-measured UE based on the channel spatial characteristic indication information and spatial channel quality information that are sent by the second base stations.

12. The base station according to claim 11, further comprising:
the processor is further configured to: when determining, according to the channel spatial characteristic indication information and the spatial channel quality information that are sent by the second base stations, that a second base station is to perform data transmission for the to-be-measured UE, select at least one second base station from the multiple second base stations as a data transmission base station according to the channel spatial characteristic indication information and the spatial channel quality information.

13. The base station according to claim 12, wherein the processor is specifically configured to select, from the multiple second base stations, a second base station whose channel spatial characteristic indication information is a line of sight and whose spatial channel quality parameter is greater than a preset threshold as the data transmission base station.

14. The base station according to claim 11, wherein the channel spatial characteristic indication information is channel spatial dominate path characteristic indication information.

15. The base station according to claim 14, wherein the angle information generated when the beam of the second base station arrives at the to-be-measured UE comprises: horizontal angle information generated when the beam of the second base station arrives at the to-be-measured UE and vertical angle information generated when the beam of the second base station arrives at the to-be-measured UE.

16. The base station according to claim 14, wherein the spatial intensity information comprises: spatial intensity level information, or comparison information about whether a spatial intensity is greater than a preset threshold.

17. A base station, wherein the base station is a second base station, comprising:
a receiver, configured to receive a channel spatial characteristic request and an identity of to-be-measured user equipment (UE) that are sent by a first base station;
a processor, configured to measure the to-be-measured UE according to the channel spatial characteristic request, so as to obtain channel spatial characteristic information; and
a transmitter, configured to send channel spatial characteristic indication information and spatial channel quality information to the first base station so the first base station determines a second base station is to perform data transmission for the to-be-measured UE based on the channel spatial characteristic indication information and the spatial channel quality information, wherein the channel spatial characteristic indication information carries the channel spatial characteristic information of the to-be-measured UE, wherein the channel spatial characteristic information comprises: angle information and spatial intensity information that are generated when a beam of the second base station arrives at the to-be-measured UE.

18. The base station according to claim 17, wherein the channel spatial characteristic indication information is channel spatial dominate path characteristic indication information.

19. The base station according to claim 18, wherein the angle information generated when the beam of the second base station arrives at the to-be-measured UE comprises: horizontal angle information generated when the beam of the second base station arrives at the to-be-measured UE and vertical angle information generated when the beam of the second base station arrives at the to-be-measured UE.

20. The base station according to claim 18, wherein the spatial intensity information comprises: spatial intensity level information, or comparison information about whether a spatial intensity is greater than a preset threshold.

* * * * *